United States Patent
Pinarbasi

(10) Patent No.: US 6,583,969 B1
(45) Date of Patent: Jun. 24, 2003

(54) PINNED LAYER STRUCTURE HAVING NICKEL IRON FILM FOR REDUCING COERCIVITY OF A FREE LAYER STRUCTURE IN A SPIN VALVE SENSOR

(75) Inventor: Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/547,960

(22) Filed: Apr. 12, 2000

(51) Int. Cl.$^7$ ................................................. G11B 5/39
(52) U.S. Cl. ............................ 360/324.11; 360/324.12; 360/314
(58) Field of Search ........................ 360/324.11, 324.12, 360/314

(56) References Cited

U.S. PATENT DOCUMENTS

| | | | |
|---|---|---|---|
| 5,287,238 A | * | 2/1994 | Baumgart et al. |
| 5,341,261 A | * | 8/1994 | Dieny et al. |
| 5,422,571 A | * | 6/1995 | Gurney et al. |
| 5,574,605 A | | 11/1996 | Baumgart |
| 5,701,222 A | * | 12/1997 | Gill et al. |
| 5,764,056 A | * | 6/1998 | Mao et al. |
| 5,768,067 A | | 6/1998 | Saito et al. |
| 5,880,913 A | * | 3/1999 | Gill |
| 5,898,549 A | * | 4/1999 | Gill |
| 6,122,150 A | * | 9/2000 | Gill ........................ 360/324.11 |
| 6,134,090 A | * | 10/2000 | Mao et al. ............. 360/324.11 |
| 6,175,476 B1 | * | 1/2001 | Huai et al. ............. 360/324.11 |
| 6,278,592 B1 | * | 8/2001 | Xue et al. .............. 360/324.12 |
| 6,317,298 B1 | * | 11/2001 | Gill ........................ 360/324.11 |
| 6,400,536 B1 | * | 6/2002 | Gill ........................ 360/324.12 |

* cited by examiner

Primary Examiner—Craig A. Renner
(74) Attorney, Agent, or Firm—Ervin F. Johnston

(57) ABSTRACT

A pinned layer structure includes a nickel iron (NiFe) film which lowers the coercivity $H_C$ of the pinned layer structure as well as the coercivity $H_C$ of a free layer structure within a spin valve sensor, thereby promoting return of a magnetic moment of the pinned layer structure to its original orientation after being rotated therefrom and promoting a freer rotation of the magnetic moment of the free layer structure in response to signal fields from a rotating magnetic disk. In a preferred embodiment the pinned layer structure is an antiparallel (AP) pinned layer structure which has an antiparallel coupling layer located between first and second AP pinned layers. In a first embodiment the first AP pinned layer is composed of a nickel iron (NiFe) film and a cobalt iron (CoFe) film with the nickel iron (NiFe) film located between a pinning layer and the cobalt iron (CoFe) film, and in a second embodiment the first AP pinned layer includes another cobalt iron (CoFe) film which is located between the pinning layer and the nickel iron (NiFe) film. In the preferred embodiment the pinning layer is composed of platinum manganese (PtMn).

48 Claims, 8 Drawing Sheets

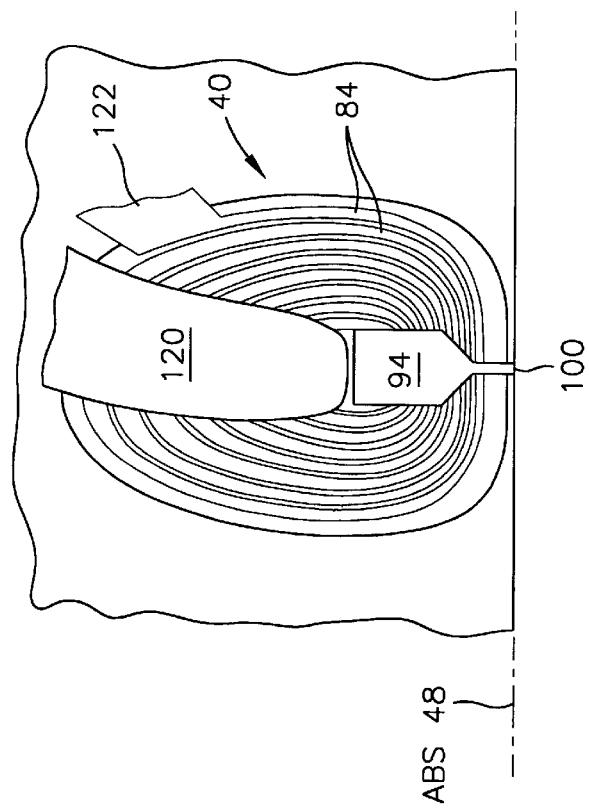
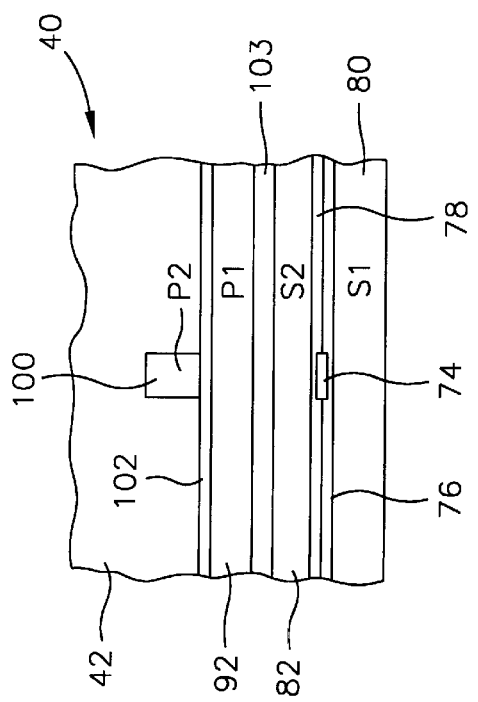
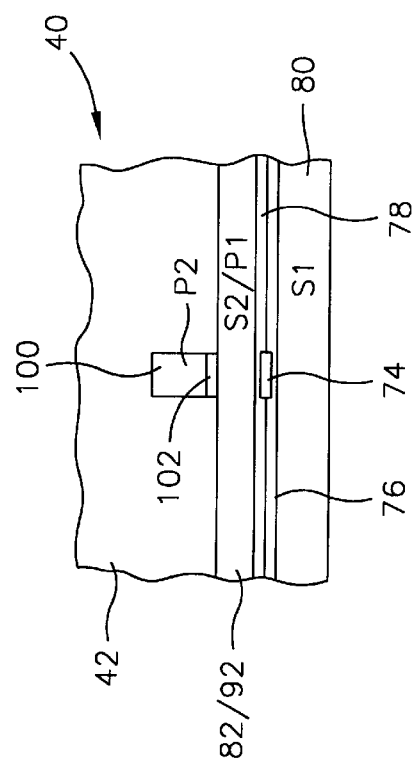

(ABS)

PINNED LAYER STRUCTURE HAVING NICKEL IRON FILM FOR REDUCING COERCIVITY OF A FREE LAYER STRUCTURE IN A SPIN VALVE SENSOR

BACKGROUND OF THE INVENTION

1. Field of the Invention

The present invention relates to a pinned layer structure having a nickel iron (NiFe) film for reducing the coercivity of a free layer structure in a spin valve sensor and, more particularly, to the nickel iron (NiFe) film acting as a seed layer for improving the sensitivity of a magnetic moment of the free layer structure to signal fields from a rotating magnetic disk.

2. Description of the Related Art

A spin valve sensor is employed by a read head for sensing magnetic signal fields from a moving magnetic medium, such as a rotating magnetic disk. The sensor includes a nonmagnetic electrically conductive first spacer layer sandwiched between a ferromagnetic pinned layer structure and a ferromagnetic free layer structure. An antiferromagnetic pinning layer interfaces the pinned layer structure for pinning a magnetic moment of the pinned layer structure 90° to an air bearing surface (ABS) wherein the ABS is an exposed surface of the sensor that faces the magnetic disk. First and second leads are connected to the spin valve sensor for conducting a sense current therethrough. A magnetic moment of the free layer structure is free to rotate upwardly and downwardly with respect to the ABS from a quiescent or bias point position in response to positive and negative magnetic field signals from a rotating magnetic disk. The quiescent position, which is preferably parallel to the ABS, is the position of the magnetic moment of the free layer structure with the sense current conducted through the sensor in the absence of signal fields.

The thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of cos θ, where θ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

A read head in a magnetic disk drive of a computer includes the spin valve sensor as well as nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a top or a bottom spin valve sensor depending upon whether the pinning layer is located near the bottom of the sensor close to the first read gap layer or near the top of the sensor close to the second read gap layer. Spin valve sensors are further classified as simple pinned or antiparallel pinned depending upon whether the pinned layer structure is one or more ferromagnetic layers with a unidirectional magnetic moment or a pair of ferromagnetic layers that are separated by a coupling layer with magnetic moments of the ferromagnetic layers being antiparallel. Spin valve sensors are still further classified as single or dual wherein a single spin valve sensor employs only one pinned layer and a dual spin valve sensor employs two pinned layers with the free layer structure located therebetween.

Because of the interfacing of the pinning layer and the pinned layer structure the pinned layer structure is exchange coupled to the pinning layer. A unidirectional orientation of the magnetic spins of the pinning layer pins the magnetic moment of the pinned layer structure in the same direction. The orientation of the magnetic spins of the pinning layer are set by applying heat close to or above a blocking temperature of the material of the pinning layer in the presence of a field that is directed perpendicular to the ABS. The blocking temperature is the temperature at which all of the magnetic spins of the pinning layer are free to rotate in response to an applied field. During the setting, the magnetic moment of the pinned layer structure is oriented parallel to the applied field and the magnetic spins of the pinning layer follow the orientation of the pinned layer structure. When the heat is reduced below the blocking temperature the magnetic spins of the pinning layer pin the orientation of the magnetic moment of the pinned layer structure. The pinning function is effective as long as the temperature remains substantially below the blocking temperature.

As stated hereinabove, the magnetic moment of the free layer structure is free to rotate in response to signal fields from a rotating magnetic disk. The degree with which the magnetic moment is free to rotate in response to these signal fields equates to the sensitivity of the spin valve sensor. Accordingly, if the magnetic moment is stiff in its rotation by rotating only a small amount in response to a signal field the signal amplitude of the spin valve sensor is low because there has been a small amount of relative rotation between the pinned layer structure and the free layer structure. A measure of the stiffness of the free layer structure is by its easy axis coercivity $H_C$ or uniaxial anisotropy $H_K$. The easy axis coercivity is the amount of field required to switch the orientation of the magnetic moment of the free layer structure 180° along its easy axis while uniaxial anisotropy $H_K$ is the amount of field required to rotate the magnetic field 90° from its easy axis. A free layer structure which consists entirely of a nickel iron (NiFe) free layer can have a low coercivity $H_C$ of only 1 or 2 Oe. It has become desirable, however, to combine a cobalt iron (CoFe) nanolayer (NL) with the nickel iron (NiFe) layer for the purpose of increasing the magnetoresistive coefficient dr/R of the spin valve sensor. Unfortunately, however, this addition raises the coercivity $H_C$ of the free layer structure up to about 10 Oe, thereby increasing the stiffness of the free layer structure in response to signal fields. There is a strong-felt need to maintain the improved magnetoresistive coefficient dr/R and reduce the coercivity $H_C$ of the free layer structure with the cobalt iron (CoFe) layer. In a dual spin valve sensor the free layer structure typically employs a nickel iron (NiFe) free layer between first and second cobalt iron (CoFe) layers. Accordingly, in the dual spin valve sensor the free layer structure is even more stiff in its operation because of the additional cobalt iron (CoFe) layer. Another problem that occurs when the coercivity $H_C$ of the free layer structure is high is that the rotation of the magnetic moment of the free layer structure in response to the signal field is not smooth. When this occurs the rotation is referred to as having jumps which causes noise in the playback system. The degree of coercivity $H_C$ of the pinned layer structure is also important which is discussed next.

In the presence of some magnetic fields the magnetic moment of the pinned layer structure can be rotated antiparallel to the pinned direction. The question then is whether the magnetic moment of the pinned layer structure will return to the pinned direction when the magnetic field is relaxed. This depends upon the strength of the exchange coupling field between the pinning layer and the pinned layer structure and the coercivity of the pinned layer structure. If the coercivity of the pinned layer structure exceeds the exchange coupling field between the pinning layer and the pinned layer structure the exchange coupling field will not be strong enough to bring the magnetic moment of the pinned layer structure back to the original pinned direction. Until the magnetic spins of the pinning layer are reset the read head is rendered inoperative. Accordingly, there is a strong felt need to decrease the coercivity of the pinned layer structure so that the exchange coupling field between the pinning layer and the pinned layer structure will return the magnetic moment of the pinned layer structure to its original orientation after being rotated therefrom.

As indicated hereinabove the strength of the exchange coupling field between the pinning layer and the pinned layer structure is also important in determining whether the pinned layer structure will return to its original orientation after being rotated therefrom. An antiferromagnetic material strongly considered for the pinning layer is nickel oxide (NiO) because it is nonmagnetic and will contribute to the read gap between the first and second shield layers by increasing the thickness of the first read gap layer. Further, since nickel oxide (NiO) is nonconductive it does not produce a sense current field on the free layer structure, upon the conduction of the sense current $I_S$, which may be desirable in some embodiments for improving a balanced bias condition of the free layer structure. Unfortunately, however, nickel oxide (NiO) provides a low exchange coupling between the pinning layer and the pinned layer structure as compared to a pinning layer made from a metal, such as platinum manganese (PtMn), iridium manganese (IrMn) and nickel manganese (NiMn). Accordingly, it is desirable to use a pinning layer made of metal in lieu of nickel oxide (NiO).

SUMMARY OF THE INVENTION

My invention is employed in a spin valve sensor which has a metallic pinning layer. I have provided the pinned layer structure with a cobalt based film and a nickel iron (NiFe) film wherein the nickel iron (NiFe) film is located between the pinning layer and the cobalt based film. With this arrangement the nickel iron (NiFe) film of the pinned layer structure acts as a seed layer to lower the coercivity $H_C$ of the free layer structure. Accordingly, the increase in coercivity $H_C$ of the free layer structure due to the inclusion of one or more cobalt iron (CoFe) films or layers is mitigated by the nickel iron (NiFe) film in the pinned layer structure.

In another embodiment of the invention the pinned layer structure includes a nickel iron (NiFe) film which is located between first and second cobalt based films with the second cobalt based film interfacing the pinning layer. With this arrangement the microstructure of the nickel iron (NiFe) film is less susceptible to alteration by the microstructure of the pinning layer due to the intervention of the cobalt based film. The invention employs a metallic pinning layer which is preferably platinum manganese (PtMn). Accordingly, the invention provides the pinned layer structure with a nickel iron (NiFe) film in combination with a spin valve sensor that employs a metallic pinning layer. Previously a pinned layer structure of a spin valve sensor has been provided with a cobalt based film and a nickel iron (NiFe) film with the nickel iron (NiFe) film located between the cobalt based film and the pinning layer and interfacing the pinning layer for the purpose of isolating a nickel oxide (NiO) pinning layer from the cobalt based film. It was found that if the cobalt based film of the pinned layer structure interfaced the nickel oxide (NiO) pinning layer that a portion of the cobalt based film became an oxide of cobalt which increased its coercivity $H_C$. Accordingly, the nickel iron (NiFe) film kept the coercivity $H_C$ of the cobalt based film from increasing due to oxidation. In contrast, the nickel iron (NiFe) film in the present invention decreases the coercivity $H_C$ of the cobalt based film in the pinned layer structure. With the nickel oxide (NiO) pinning layer there has been no data indicating that the nickel iron (NiFe) film, which interfaces the nickel oxide (NiO) pinning layer, also reduces the coercivity $H_C$ of the free layer structure. In contrast, it has been found that the present invention also reduces the coercivity $H_C$ of the free layer structure.

The invention is particularly useful in a dual spin valve sensor wherein the coercivity of the free layer structure is higher than that of a free layer structure in a single spin valve sensor. In the dual spin valve sensor a free layer structure is located between first and second spacer layers, the first and second spacer layers are located between first and second pinned layer structures and the first and second pinned layer structures are exchange coupled to first and second pinning layers. In the dual spin valve sensor the free layer structure has a higher coercivity $H_C$ due to the fact that a nickel iron (NiFe) layer is located between first and second cobalt iron (CoFe) layers. In the dual spin valve sensor embodiment each of the first and second pinned layer structures includes a cobalt based film and a nickel iron (NiFe) film. Preferably, each of the first and second pinned layer structures includes a nickel iron (NiFe) film which is located between first and second cobalt based films as described hereinabove.

In yet another preferred embodiment the pinned layer structure of the single spin valve sensor or the first and second pinned layer structures of the dual spin valve sensor are an antiparallel (AP) pinned layer structure wherein an AP coupling layer is located between first and second AP pinned layers. When the pinned layer structure is an AP pinned layer structure the first AP pinned layer, which is closest to the pinning layer, includes the aforementioned cobalt based film and the nickel iron (NiFe) film.

An object of the present invention is to provide a pinned layer structure of a spin valve sensor with a nickel iron (NiFe) film which reduces the coercivity of each of the pinned layer structure and a free layer structure in a spin valve sensor.

Another object is to provide a nickel iron (NiFe) film in a pinned layer structure which is exchange coupled to a metallic pinning layer for the purpose of serving as a seed layer for improving the performances of the pinned layer structure and the free layer structure.

Other objects and attendant advantages of the invention will be appreciated upon reading the following description taken together with the accompanying drawings.

BRIEF DESCRIPTION OF THE DRAWINGS

FIG. 8 is a partial ABS view of the slider taken along plane 8—8 of FIG. 6 to show the read and write elements of the piggyback magnetic head;

FIG. 9 is a partial ABS view of the slider taken along plane 9—9 of FIG. 7 to show the read and write elements of the merged magnetic head;

FIG. 10 is a view taken along plane 10—10 of FIG. 6 or 7 with all material above the coil layer and leads removed;

DESCRIPTION OF THE PREFERRED EMBODIMENTS

Magnetic Disk Drive

Figure 1:
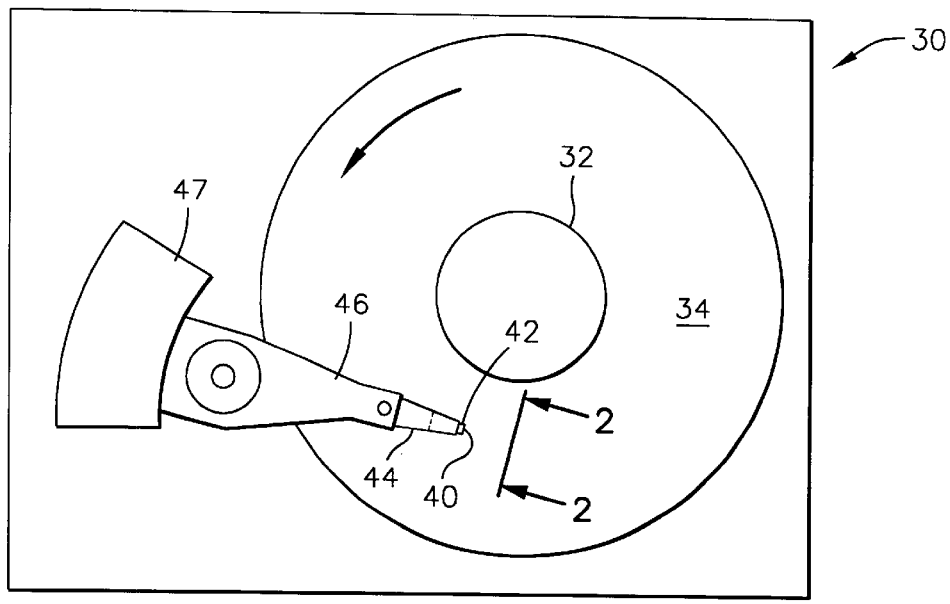
FIG. 1 is a planar view of an exemplary magnetic disk drive.
Figure 2:
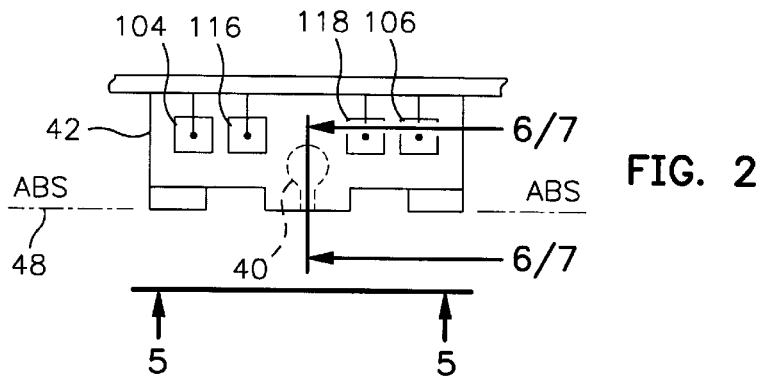
FIG. 2 is an end view of a slider with a magnetic head of the disk drive as seen in plane 2—2.
Figure 3:
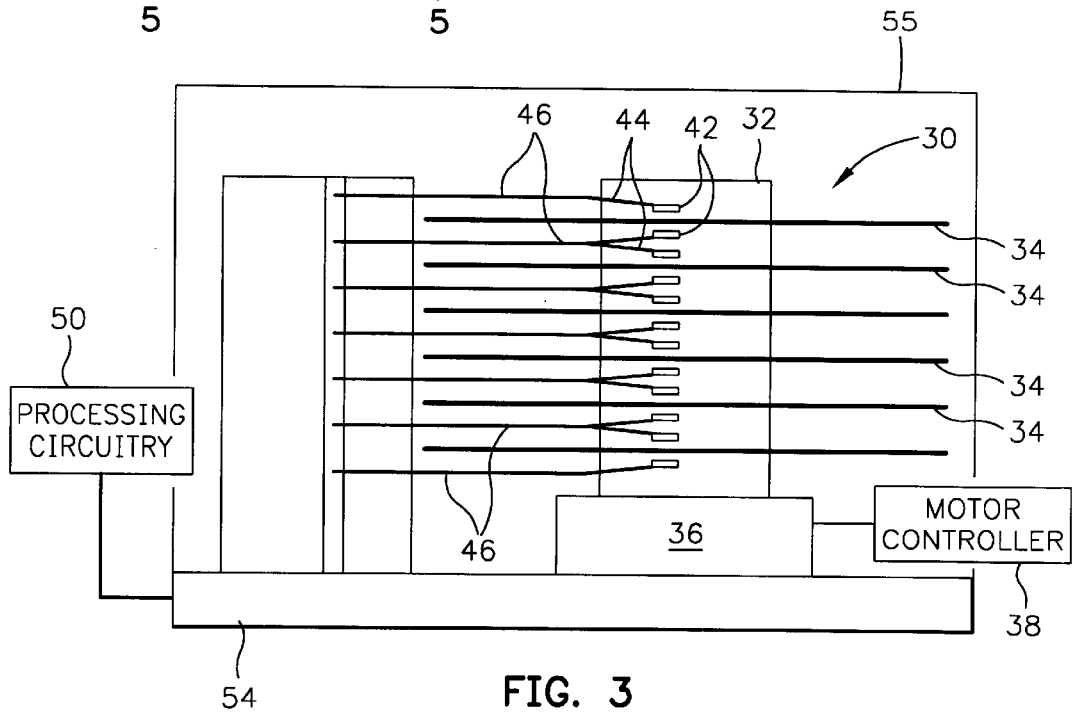
FIG. 3 is an elevation view of the magnetic disk drive wherein multiple disks and magnetic heads are employed.
Figure 4:
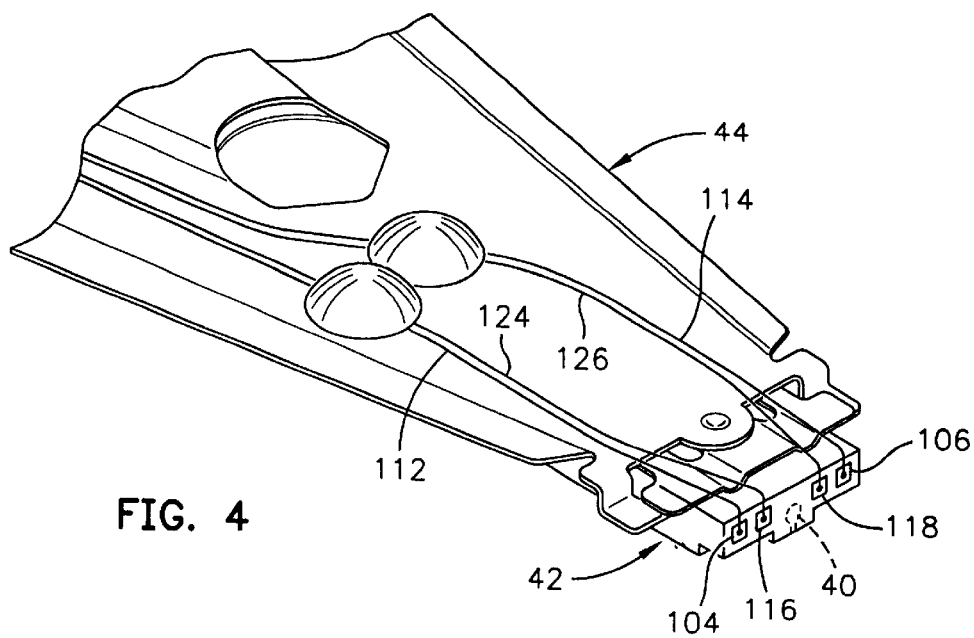
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 supports a combined read and write magnetic head 40 and is supported by a suspension 44 and actuator arm 46 that is rotatably positioned by an actuator 47. A plurality of disks, sliders and suspensions may be employed in a large capacity direct access storage device. (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
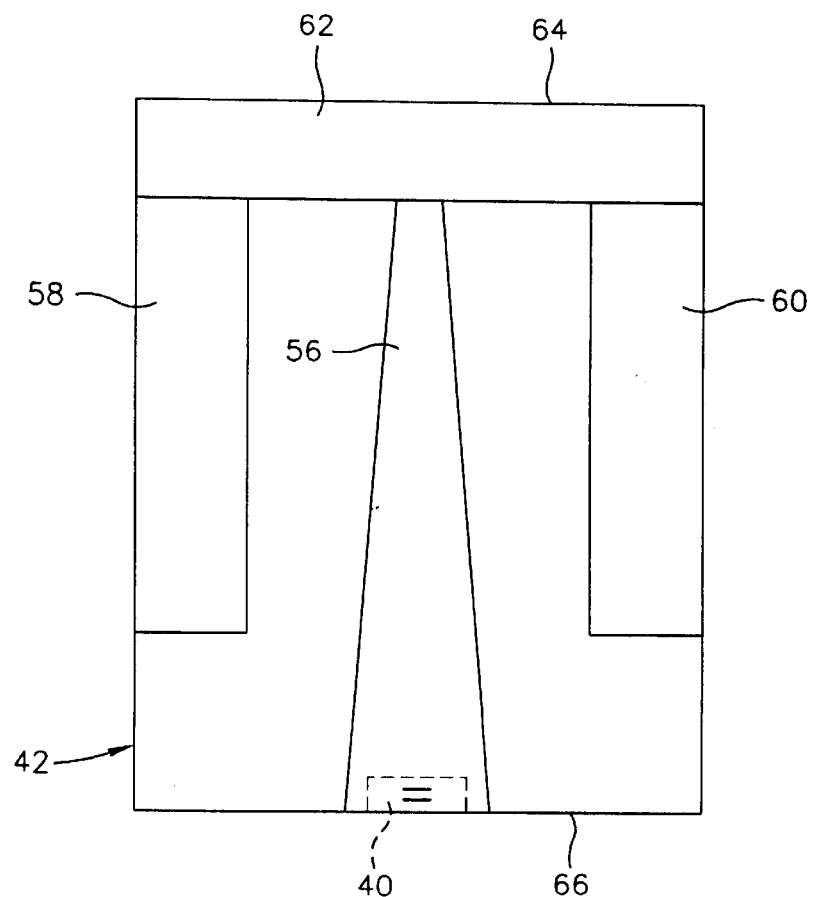
FIG. 5 is an ABS view of the slider taken along plane 5—5 of FIG. 2.

FIG. 5 is an ABS view of the slider 42 and the magnetic head 40. The slider has a center rail 56, which supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
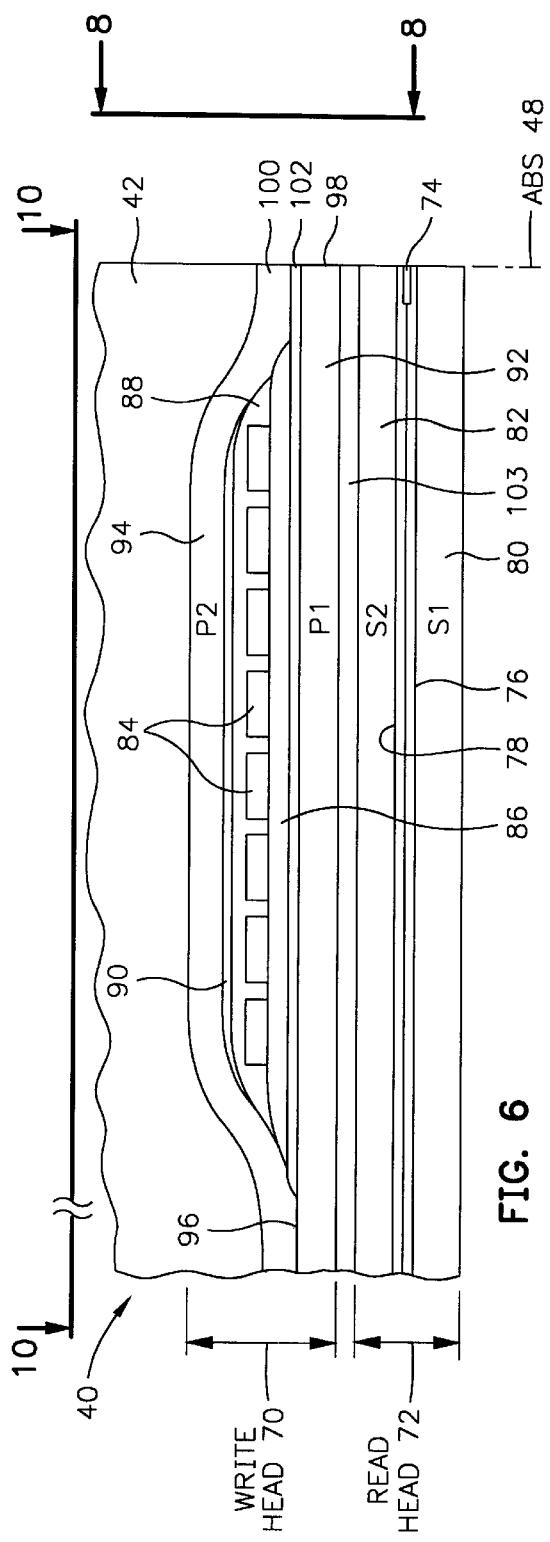
FIG. 6 is a partial view of the slider and a piggyback magnetic head as seen in plane 6—6 of FIG. 2.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 7:
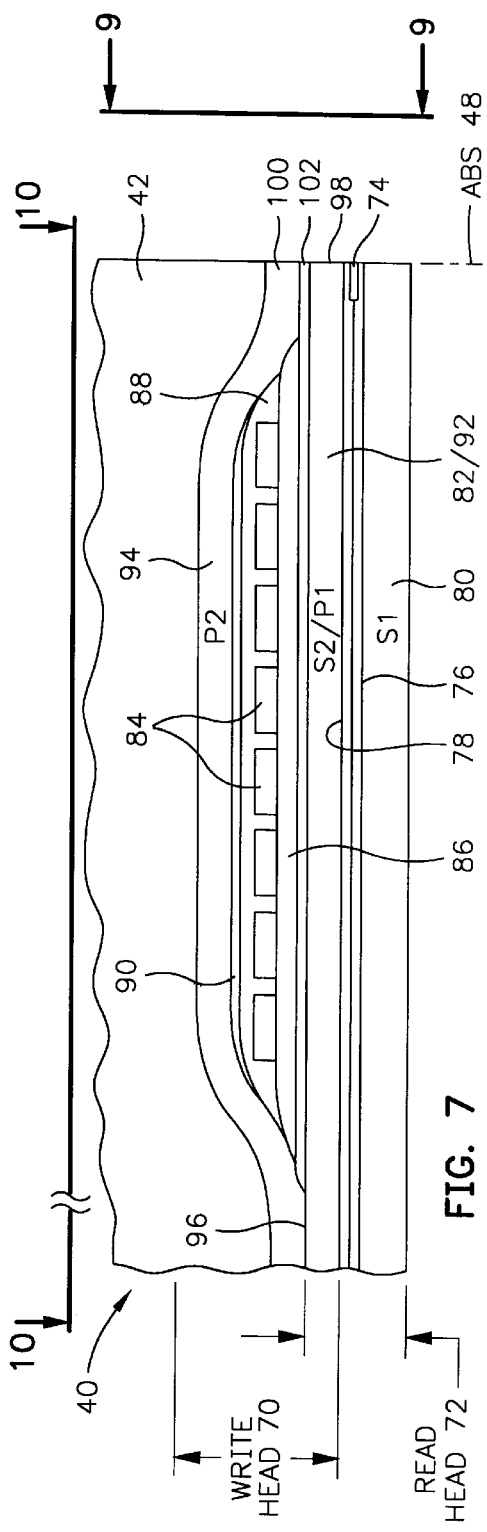
FIG. 7 is a partial view of the slider and a merged magnetic head as seen in plane 7—7 of FIG. 2.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
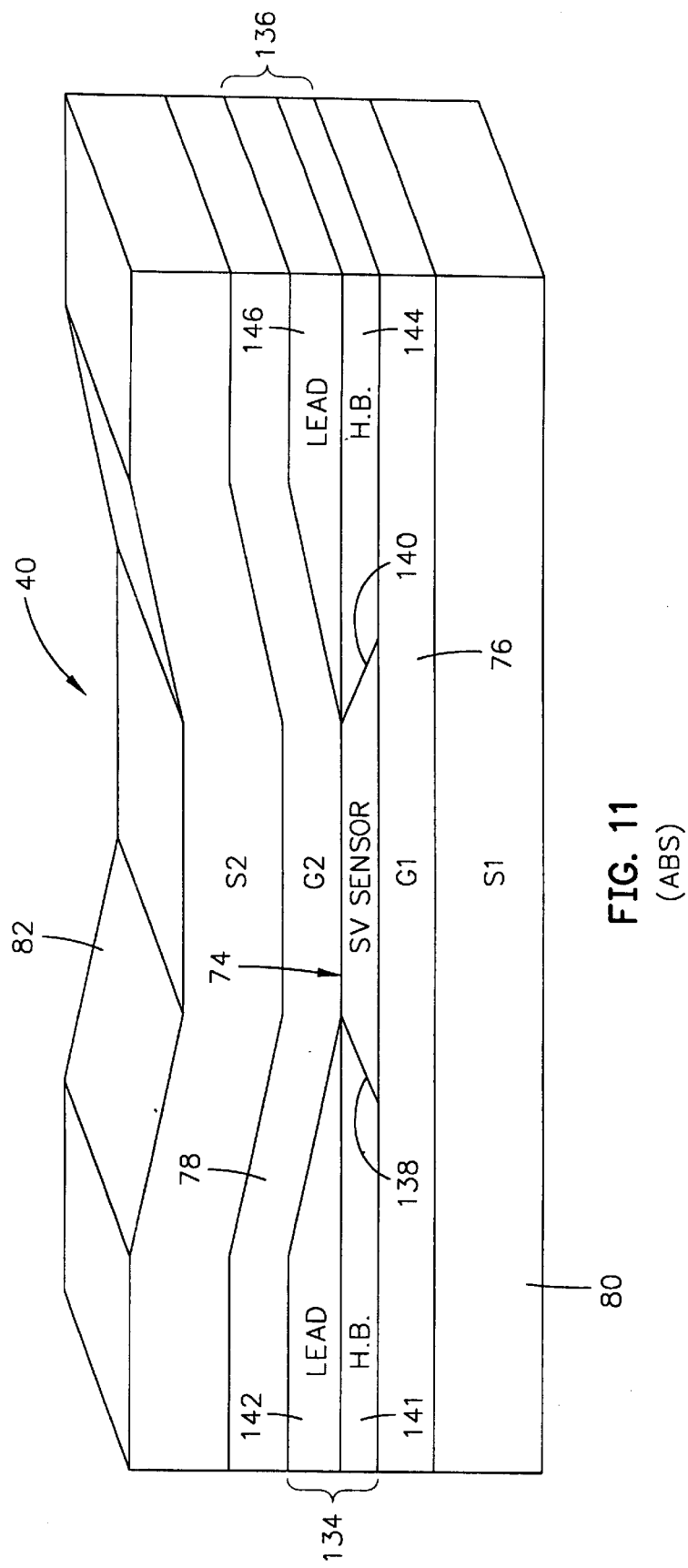
FIG. 11 is an isometric ABS illustration of an exemplary read head which employs a spin valve sensor longitudinally biased by hard biasing layers.

FIG. 11 is an isometric ABS illustration of a read head 72 which has a spin valve sensor 130 with a pinning layer 132 which is typically nickel oxide (NiO). First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037. The first hard bias and lead layers include a first hard bias layer 141 and a first lead layer 142 and the second hard bias and lead layers 136 include a second hard bias layer 144 and a second lead layer 146. The hard bias layers 141 and 144 cause magnetic flux to extend longitudinally through the spin valve sensor 130 for stabilizing magnetic domains of the free layer. The spin valve sensor 130 and the first and second hard bias and lead layers 134 and 136 are located between nonmagnetic electrically insulative first and second read gap layers 148 and 150. The first and second read gap layers 148 and 150 are, in turn, located between first and second shield layers 152 and 154. The present invention replaces the nickel oxide (NiO) pinning layer 132 with a metallic pinning layer as will be described hereinafter.

EXAMPLE 1

Comparative Example

Figure 12:
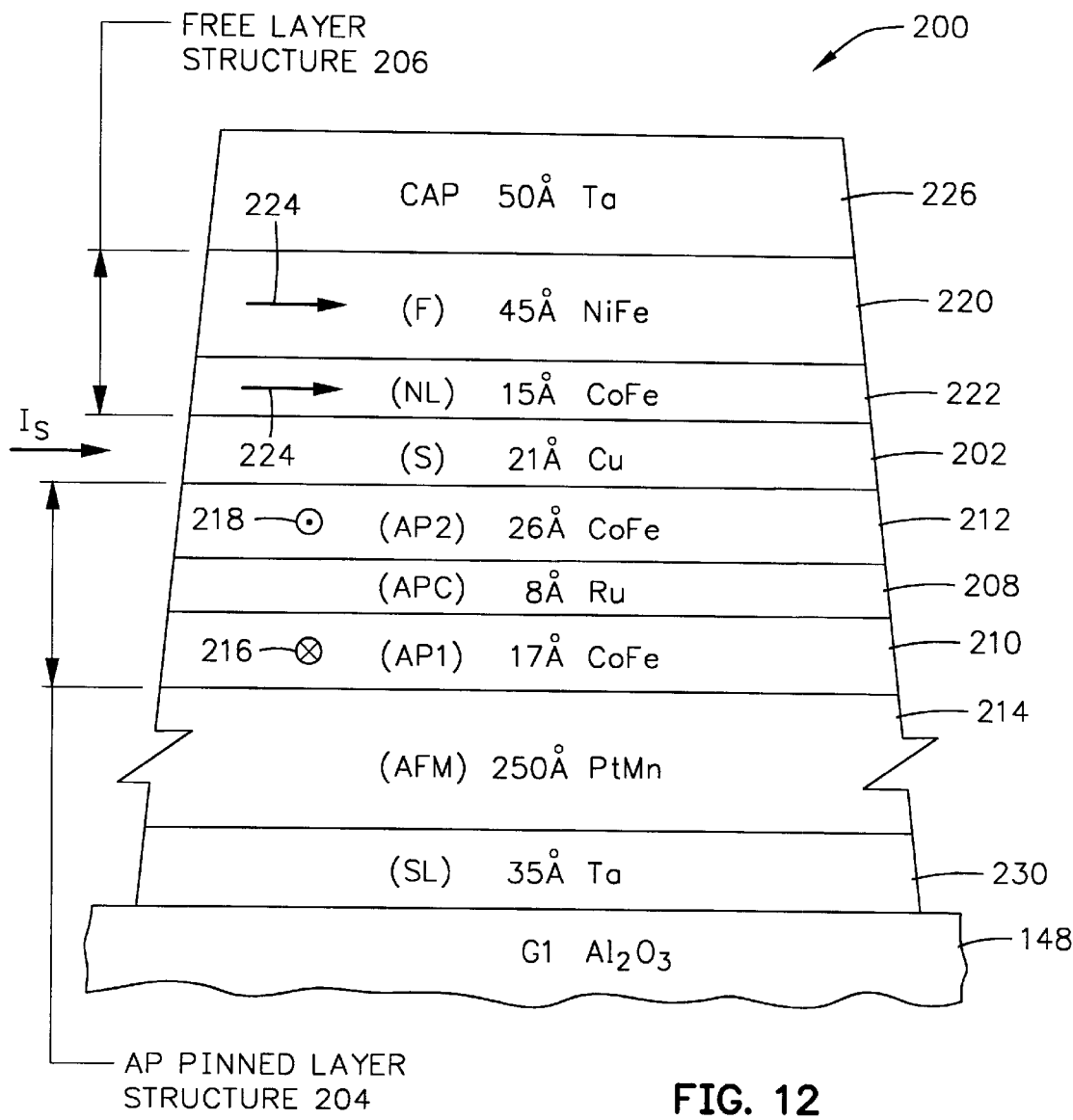
FIG. 12 is an ABS illustration of a comparative example of a spin valve sensor.

FIG. 12 shows an ABS illustration of an exemplary spin valve sensor 200 which includes a nonmagnetic conductive spacer layer (S) 202 which is located between an antiparallel (AP) pinned layer structure 204 and a free layer structure 206. The AP pinned layer structure 204 includes an antiparallel coupling (APC) layer 208 which is located between ferromagnetic first and second AP pinned layers (AP1) and (AP2) 210 and 212. The first AP pinned layer 210 is exchange coupled to an antiferromagnetic (AFM) pinning layer 214 for pinning a magnetic moment 216 of the first AP pinned layer perpendicular to the ABS in a direction into the sensor, as shown, or optionally away from the sensor. By strong antiparallel coupling between the first and second AP pinned layers 210 and 212 a magnetic moment 218 of the second AP pinned layer is pinned antiparallel to the magnetic moment 216.

The free layer structure 206 includes a ferromagnetic free layer (F) 220 of nickel iron ($Ni_{80}Fe_{20}$) and a nanolayer (NL) 222 of cobalt iron ($Co_{90}Fe_{10}$). It has been found that the nanolayer 222 of cobalt iron (CoFe) significantly increases the magnetoresistive coefficient dr/R of the sensor when it interfaces the spacer layer 202 and is located between the spacer layer and the free layer 220. The free layer structure has a magnetic moment 224 which is parallel to the ABS and directed from left to right, as shown, or optionally from right to left. A cap layer 226 was located on the free layer 220 for protecting it from subsequent processing steps. When the magnetic moment 224 is rotated into the sensor by a signal field from a rotating magnetic disk the magnetic moments 224 and 218 become more antiparallel which increases the resistance of the sensor to the sense current $I_S$ and when the magnetic moment 224 is rotated out of the sensor the magnetic moments 224 and 218 become more parallel which decreases the resistance of the sensor to the sense current $I_S$. These resistance changes cause potential changes in a sense current circuit which is processed as playback signals by the processing circuitry 50 in FIG. 3.

The pinning layer 214 was composed of platinum manganese ($Pt_{50}Mn_{50}$) which has a blocking temperature of about 375° C. The spin valve sensor was constructed on the first read gap layer (G1) which is the read gap layer 148 in FIG. 11. A tantalum (Ta) seed layer (SL) 230 was used between the first read gap layer 148 and the platinum manganese (PtMn) pinning layer 214 for improving the performance of the pinning layer. The thicknesses and materials of the layers were 35 Å of tantalum (Ta) for the seed layer 230, 250 Å of platinum manganese ($Pt_{50}Mn_{50}$) for the pinning layer 214, 17 Å of cobalt iron ($Co_{90}Fe_{10}$) for the first AP pinned layer 210, 8 Å of ruthenium (Ru) for the antiparallel coupling layer 208, 26 Å of cobalt iron ($Co_{90}Fe_{10}$) for the second AP pinned layer 212, 21 Å of copper (Cu) for the spacer layer 202, 15 Å of cobalt iron ($Co_{90}Fe_{10}$) for the nanolayer 222, 45 Å of nickel iron ($Ni_{80}Fe_{20}$) for the free layer 220 and 50 Å of tantalum (Ta) for the cap layer 226.

Upon testing the example described hereinabove the coercivity $H_C$ of the free layer structure 206 was 5.44 Oe, the coercivity $H_C$ of the first AP pinned layer 210 was 750 Oe, the coercivity $H_C$ of the second AP pinned layer 212 was 75 Oe and the magnetoresistive coefficient dr/R of the sensor was 7.7%. The goal of the invention, described hereinafter, is to improve the coercivity $H_C$ of each of the free layer structure 206 and the first and second AP pinned layers 210 and 212.

EXAMPLE 2

First Embodiment of the Present Invention

Figure 13:
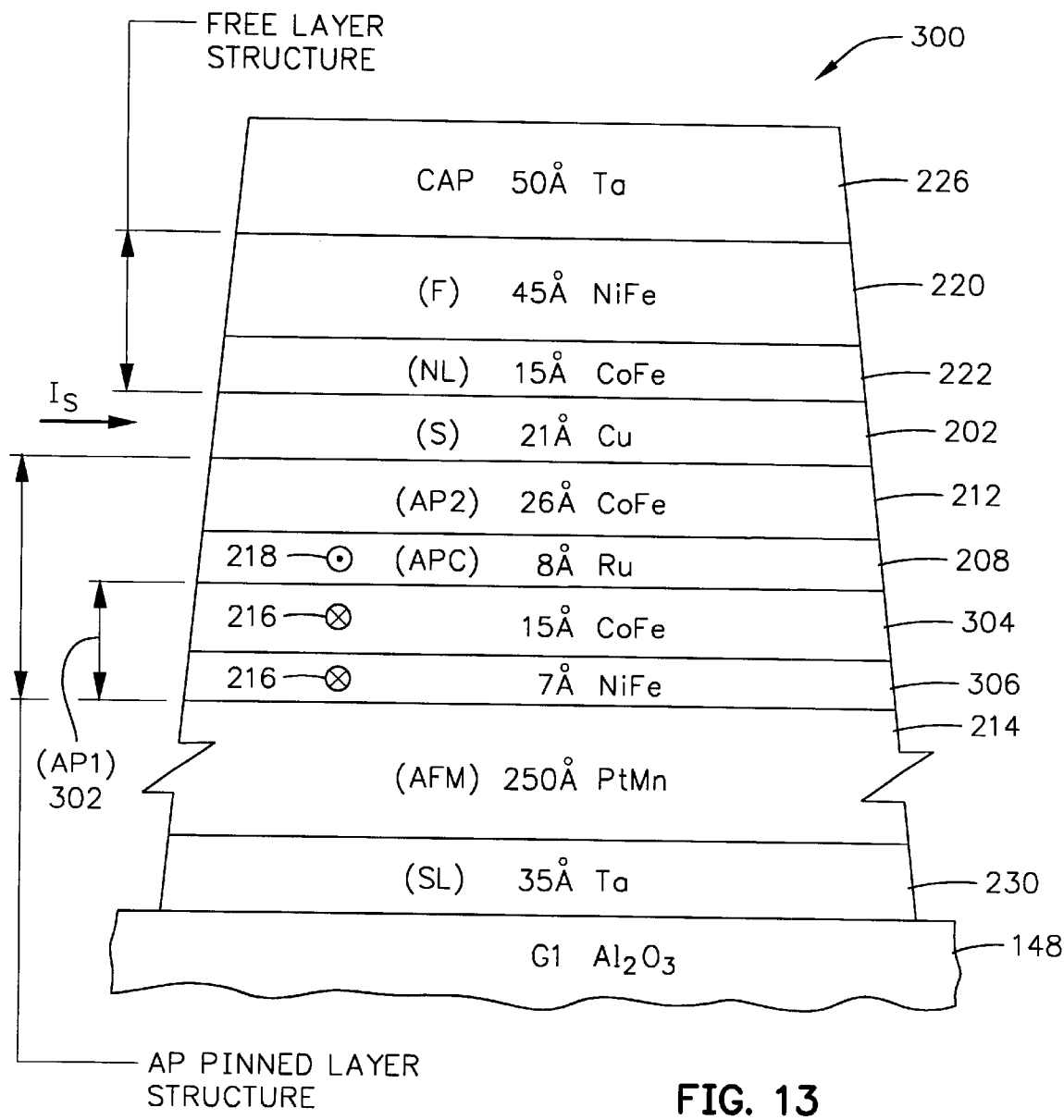
FIG. 13 is an ABS illustration of a first embodiment of the present spin valve sensor.

A first embodiment of the present spin valve sensor 300 is shown in FIG. 13 which was the same as the example 200 shown in FIG. 12 except the spin valve sensor 300 included a first AP pinned layer (AP1) 302 which includes a cobalt iron (CoFe) film 304 and a nickel iron (NiFe) film 306. The cobalt iron ($Co_{90}Fe_{10}$) film 304 was 17 Å thick and the nickel iron ($Ni_{80}Fe_{20}$) film 306 was 7 Å thick. The nickel iron ($Ni_{80}Fe_{20}$) film 306 interfaced the pinning layer 214 and was located between the pinning layer and the cobalt iron ($Co_{90}Fe_{10}$) film 304.

After testing this example it was found that the coercivity $H_C$ of the free layer structure 206 was 4.5 Oe, the coercivity $H_C$ of the first AP pinned layer 302 was 450 Oe, the coercivity $H_C$ of the second AP pinned layer 212 was 30 Oe and the magnetoresistive coefficient dr/R of the sensor was 7.25%. In comparing the embodiment 300 with the embodiment 200 it can be seen that the magnetoresistive coefficient dr/R of the embodiment 300 dropped slightly, however, the coercivities of the free layer structure 206 and each of the first and second AP pinned layers 306 and 212 significantly improved. Accordingly, the free layer structure 206 in the embodiment 300 will be more responsive to signal fields from a rotating magnetic disk than the free layer structure 206 of the embodiment 200, and the magnetic moments 216 and 218 of the first and second AP pinned layers 302 and 212 in the embodiment 300 can be more easily returned to their original orientation by the pinning layer 214 after they have been rotated from the original orientation by some extraneous field.

Second Embodiment of the Present Invention

Figure 14:
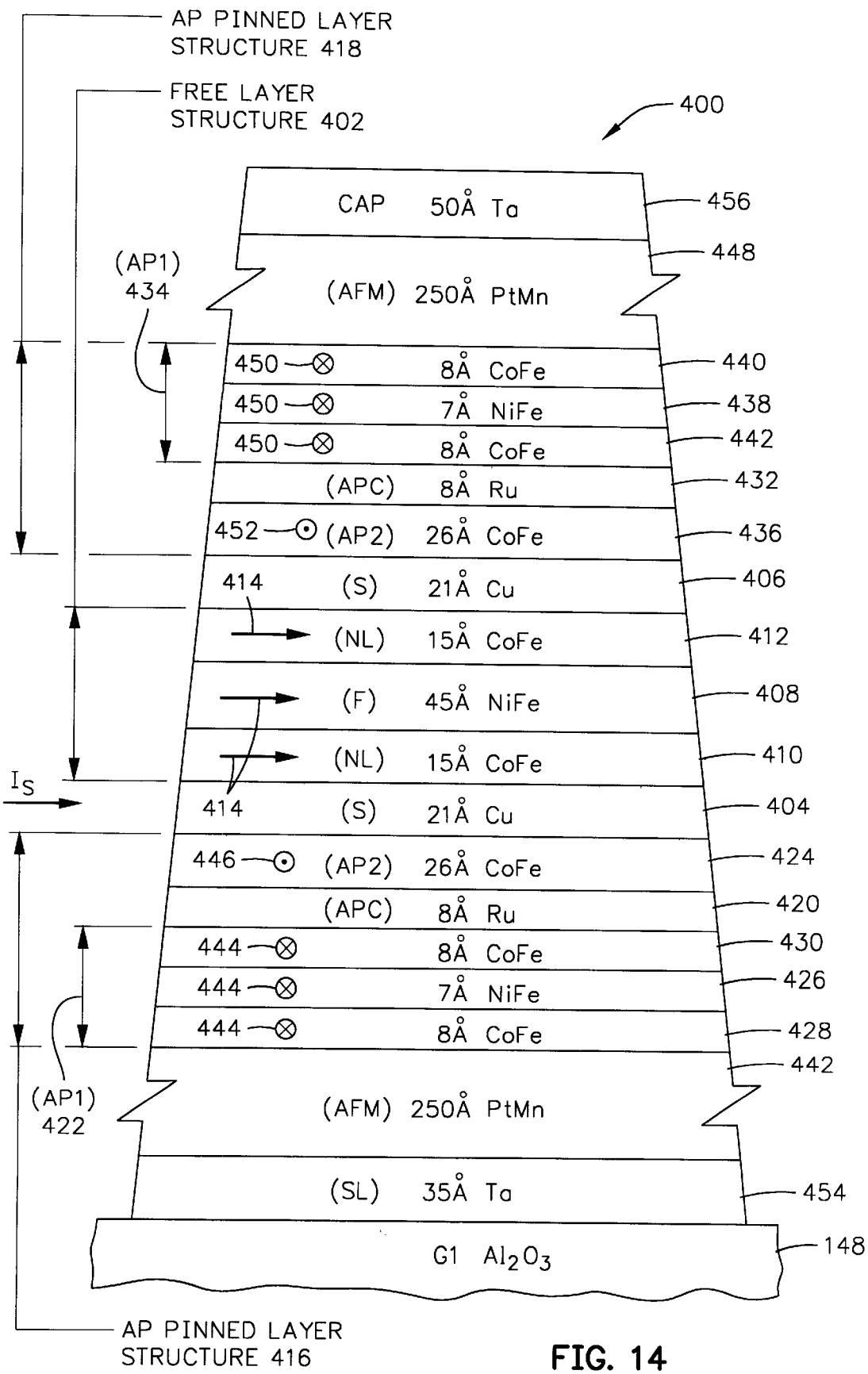
FIG. 14 is an ABS illustration of a second embodiment of the present spin valve sensor.

The second embodiment of the present spin valve sensor 400 is shown in FIG. 14 which includes a free layer structure 402 which is located between first and second nonmagnetic conductive spacer layers 404 and 406. The free layer structure 402 includes a nickel iron (NiFe) free layer (F) 408 which is located between first and second cobalt iron (CoFe) nanolayers (NL) 410 and 412. The first and second nanolayers 410 and 412 have been found to significantly increase the magnetoresistive coefficient dr/R of the spin valve sensor. The free layer structure 402 has a magnetic moment 414 which is parallel to the ABS and directed from left to right, as shown, or optionally from right to left. The first and second spacer layers 404 and 406 are located between first and second antiparallel (AP) pinned layer structures 416 and 418. The first AP pinned layer structure 416 includes an antiparallel coupling layer (APC) 420 which is located between first and second AP pinned layers (AP1) and (AP2) 422 and 424. The first AP pinned layer 422 includes a nickel iron (NiFe) film 426 which is located between first and second cobalt iron (CoFe) films 428 and 430. The second AP pinned layer structure 418 includes an AP coupling layer (APC) 432 which is located between first and second AP pinned layers (AP1) and (AP2) 434 and 436. The first AP pinned layer 434 includes a nickel iron (NiFe) film 438 which is located between first and second cobalt iron (CoFe) films 440 and 442.

The first cobalt iron (CoFe) film 428 interfaces a first antiferromagnetic (AFM) pinning layer 442 so that the pinning layer 442 and the first AP pinned layer structure 416 are exchange coupled with respect to one another. This pins a magnetic moment 444 of the first AP pinned layer 422 perpendicular to the ABS in a direction into the sensor, as shown, or optionally out of the sensor. By strong antiparallel coupling between the first and second AP pinned layers 422 and 424 the magnetic moment 446 of the second AP pinned layer is antiparallel to the magnetic moment 444. The first cobalt iron (CoFe) film 440 interfaces a second antiferromagnetic (AFM) pinning layer 448 so that the pinning layer 448 is exchange coupled to the second AP pinned layer structure 418. The pinning layer 448 pins a magnetic moment 450 of the first AP pinned layer perpendicular to the ABS in a direction into the sensor, as shown, or optionally out of the sensor. By strong antiparallel coupling the magnetic moment 452 of the second AP pinned layer 436 is antiparallel to the magnetic moment 450. The pinning layers 442 and 448 are preferably platinum manganese (PtMn). The pinning performance of the first pinning layer 442 is improved by employing a tantalum (Ta) seed layer 454 between the pinning layer 442 and the first read gap layer 148. A tantalum (Ta) cap layer 456 is provided on the second pinning layer 448 for protecting it from subsequent processing steps.

When a signal field from a rotating magnetic disk rotates the magnetic moment 414 of the free layer structure into the head the magnetic moment 414 becomes more antiparallel relative to the magnetic moments 446 and 452 of the second AP pinned layers 424 and 436 which causes an increase in the resistance of the spin valve sensor to the sense current $I_S$ and when the magnetic moment 414 is rotated out of the head the magnetic moment 414 becomes more parallel with respect to the magnetic moments 446 and 452 which decreases the resistance of the head to the sense current $I_S$. These changes in resistance causes changes in potentials in the sense current circuit which is processed as playback signals by the processing circuitry 50 in FIG. 3. It should be noted that since there is a pinned layer structure on each side of the free layer structure 402 that spin valve effects on each side of the free layer structure are additive to increase the magnetoresistive coefficient dr/R of the spin valve sensor as compared to a single spin valve sensor as shown in FIGS. 13 and 14.

Exemplary thicknesses and materials for the layers are 35 Å of tantalum (Ta) for the seed layer 454, 250 Å of platinum manganese (PtMn) for each of the pinning layers 442 and 448, 8 Å of cobalt iron (CoFe) for each of the second cobalt iron (CoFe) films 428 and 440, 7 Å of nickel iron (NiFe) for each of the films 426 and 438, 8 Å of cobalt iron (CoFe) for each of the films 430 and 442, 8 Å of ruthenium (Ru) for each of the antiparallel coupling layers 420 and 432, 26 Å of cobalt iron (CoFe) for the second AP pinned layers 424 and 436, 21 Å of copper (Cu) for the spacer layers 404 and 406, 15 Å of cobalt iron (CoFe) for the nanolayers 410 and 412, 45 Å of nickel iron (NiFe) for the free layer 408 and 50 Å of tantalum (Ta) for the cap layer 460.

It should be noted that the first AP pinned layer 422 differs from the first AP pinned layer 302 in FIG. 13 in that a cobalt iron (CoFe) film is located between the pinning layer 442 and the nickel iron (NiFe) film 426 for ensuring the microstructure integrity of the nickel iron film 426. The nickel iron (NiFe) film 426 contributes to lowering the coercivity $H_C$ of the free layer structure 402 as well as lowering the coercivities of the first AP pinned layers 422 and 434 and the second AP pinned layers 424 and 436. Platinum manganese (PtMn) is the preferred material for the first and second pinning layers 442 and 448.

Discussion

It should be understood that a cobalt based material can be used in place of the cobalt iron (CoFe) films and layers in the embodiments 300 and 400. Further, while the preferred composition of the cobalt iron (CoFe) films and layers is $Co_{90}Fe_{10}$, the preferred composition of the nickel iron (NiFe) films and layers is $Ni_{80}Fe_{20}$ and the preferred composition of the platinum manganese (PtMn) pinning layers is $Pt_{50}Mn_{50}$, it should be understood that the percentage of each element can be any amount provided the total for the alloy equals 100 percent. It also should be understood that other antiferromagnetic metallic materials may be used for the pinning layers 214 in FIG. 13 and 442 and 448 in FIG. 14, such as iridium manganese (IrMn) and nickel manganese (NiMn). Also, it should be understood that the thicknesses for the various layers shown in FIG. 14 are exemplary and can be changed as desired. It should further be understood that any of the AP pinned layer structures in FIGS. 13 and 14 may be a single pinned layer which may comprise one or more ferromagnetic films. Also, the invention is intended to encompass a top spin valve sensor which is essentially an inversion of the spin valve sensor shown in FIG. 13, except for the first read gap layer 148, with the pinning layer 214 being located at the top instead of at the bottom of the spin valve sensor.

Further, the tantalum (Ta) seed layers 230 and 454 in FIGS. 13 and 14 may have an additional seed layer of nickel manganese oxide (NiMnO) below the tantalum (Ta) seed layer and may have a still further seed layer of aluminum oxide ($Al_2O_3$) below the nickel manganese oxide (NiMnO) seed layer.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A magnetic read head comprising:
   a spin valve sensor including:
   a ferromagnetic free layer structure that has a magnetic moment;
   a ferromagnetic pinned layer structure that has a magnetic moment;
   a nonmagnetic conductive spacer layer located between the free layer structure and the pinned layer structure;
   an antiferromagnetic metallic pinning layer exchange coupled to the pinned layer structure for pinning the magnetic moment of the pinned layer structure;
   the pinned layer structure including first and second cobalt based films and a nickel iron (NiFe) film with the nickel iron (NiFe) film being located between and interfacing the first and second cobalt (Co) based films; and
   the first cobalt (Co) based film interfacing the metallic pinning layer.

2. A magnetic read head as claimed in claim 1 including:
   first and second hard bias and lead layers connected to the spin valve sensor;
   nonmagnetic nonconductive first and second read gap layers;
   the spin valve sensor and the first and second hard bias and lead layers being located between the first and second read gap layers;

ferromagnetic first and second shield layers; and
the first and second read gap layers being located between the first and second shield layers.

3. A magnetic read head as claimed in claim 2 wherein the pinning layer is located between the first read gap layer and the pinned layer structure.

4. A magnetic read head as claimed in claim 3 wherein the pinned layer structure is an antiparallel (AP) pinned layer structure that includes:
ferromagnetic first and second antiparallel (AP) pinned layers;
an antiparallel (AP) coupling layer located between the first and second AP pinned layers;
the first AP pinned layer being located between the pinning layer and the second AP pinned layer; and
the first AP pinned layer including said first and second cobalt based films and the nickel iron (NiFe) film.

5. A magnetic read head as claimed in claim 4 wherein the pinning layer is platinum manganese (PtMn).

6. A magnetic read head as claimed in claim 5 wherein the free layer structure includes a nickel iron (NiFe) layer and a cobalt iron (CoFe) layer with the cobalt iron (CoFe) layer interfacing the spacer layer.

7. A magnetic head assembly comprising:
a write head including:
ferromagnetic first and second pole piece layers wherein each of the first and second pole piece layers has a pole tip portion, a yoke portion and a back gap portion with the yoke portion located between the pole tip portion and the back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions, a read head including:
a spin valve sensor;
first and second hard bias and lead layers connected to the valve sensor;
nonmagnetic nonconductive first and second read gap layers;
the spin valve sensor and the first and second hard bias and lead layers being located between the first and second read gap layers;
a ferromagnetic first shield layer; and
the first and second gap layers being located between the first shield layer and the first pole piece layer;
the spin valve sensor including:
a ferromagnetic free layer structure that has a magnetic moment;
a ferromagnetic pinned layer structure that has a magnetic moment;
a nonmagnetic conductive spacer layer located between the free layer structure and the pinned layer structure;
an antiferromagnetic metallic pinning layer exchange coupled to the pinned layer structure for pinning the magnetic moment of the pinned layer structure;
the pinned layer structure including first and second cobalt based films and a nickel iron (NiFe) film with the nickel iron (NiFe) film being located between and interfacing the first and second cobalt (Co) based films; and
the first cobalt (Co) based film interfacing the metallic pinning layer.

8. A magnetic head assembly as claimed in claim 7 wherein the pinning layer is located between the first read gap layer and the first pinned layer structure.

9. A magnetic head assembly as claimed in claim 8 wherein the pinned layer structure is an antiparallel (AP) pinned layer structure that includes:
ferromagnetic first and second antiparallel (AP) pinned layers;
an antiparallel (AP) coupling layer located between the first and second AP pinned layers;
the first AP pinned layer being located between the pinning layer and the AP coupling layer; and
the first AP pinned layer including said first and second cobalt based films and the nickel iron (NiFe) film.

10. A magnetic head assembly as claimed in claim 9 wherein the pinning layer is platinum manganese (PtMn).

11. A magnetic head assembly as claimed in claim 10 wherein the free layer structure includes a nickel iron (NiFe) layer and a cobalt iron (CoFe) layer with the cobalt iron (CoFe) layer interfacing the spacer layer.

12. A magnetic disk drive having a magnetic head assembly wherein the magnetic head assembly has a write head and a read head, comprising:
the write head including:
ferromagnetic first and second pole piece layers wherein each of the first and second pole piece layers has a pole tip portion, a yoke portion and a back gap portion with the yoke portion located between the pole tip portion and the back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; the read head including:
a spin valve sensor;
first and second hard bias and lead layers connected to the spin valve sensor;
nonmagnetic nonconductive first and second read gap layers;
the spin valve sensor being located between the first and second read gap layers;
a ferromagnetic first shield layer; and
the first and second read gap layers being located between the first shield layer and the first pole piece layer;
the spin valve sensor including:
a ferromagnetic free layer structure that has a magnetic moment;
a ferromagnetic pinned layer structure that has a magnetic moment;
a nonmagnetic conductive spacer layer located between the free layer structure and the pinned layer structure;
an antiferromagnetic metallic pinning layer exchange coupled to the pinned layer structure for pinning the magnetic moment of the pinned layer structure;
the pinned layer structure including first and second cobalt based films and a nickel iron (NiFe) film with the nickel iron (NiFe) film being located between and interfacing the first and second cobalt (Co) based films; and
the first cobalt (Co) based film interfacing the metallic pinning layer;
a housing;

a magnetic disk rotatably supported in the housing;

a support mounted in the housing for supporting the magnetic head assembly with a head surface of the magnetic head assembly facing the magnetic disk so that the magnetic head assembly is in a transducing relationship with the magnetic disk;

a spindle motor for rotating the magnetic disk;

an actuator positioning means connected to the support for moving the magnetic head assembly to multiple positions with respect to said magnetic disk; and a processor connected to the magnetic head assembly, to the spindle motor and to the actuator positioning means for exchanging signals with the magnetic head assembly, for controlling movement of the magnetic disk and for controlling the position of the magnetic head assembly.

13. A magnetic disk drive as claimed in claim 12 wherein the pinning layer is located between the first read gap layer and the pinned layer structure.

14. A magnetic disk drive as claimed in claim 13 wherein the pinned layer structure is an antiparallel (AP) pinned layer structure that includes:

ferromagnetic first and second antiparallel (AP) pinned layers;

an antiparallel (AP) coupling layer located between the first and second AP pinned layers;

the first AP pinned layer being located between the pinning layer and the AP coupling layer; and the first AP pinned layer including said first and second cobalt based films and the nickel iron (NiFe) film.

15. A magnetic disk drive as claimed in claim 14 wherein the pinning layer is platinum manganese (PtMn).

16. A method of making a magnetic read head comprising the steps of:

making a spin valve sensor as follows:

forming a ferromagnetic free layer structure that has a magnetic moment;

forming a ferromagnetic pinned layer structure that has a magnetic moment;

forming a nonmagnetic conductive spacer layer between the free layer structure and the pinned layer structure;

forming an antiferromagnetic metallic pinning layer exchange coupled to the pinned layer structure for pinning the magnetic moment of the pinned layer structure;

forming the pinned layer structure with first and second cobalt based films and a nickel iron (NiFe) film with the nickel iron (NiFe) film being located between and interfacing the first and second cobalt (Co) based films; and forming the first cobalt (Co) based film interfacing the metallic pinning layer.

17. A method of making a magnetic read head as claimed in claim 16 including:

connecting first and second hard bias and lead layers to the spin valve sensor;

forming nonmagnetic nonconductive first and second read gap layers;

forming the spin valve sensor and the first and second hard bias and lead layers between the first and second read gap layers;

forming ferromagnetic first and second shield layers; and forming the first and second read gap layers between the first and second shield layers.

18. A method of making a magnetic read head as claimed in claim 17 wherein the pinning layer is formed between the first read gap layer and the pinned layer structure.

19. A method of making a magnetic read head as claimed in claim 18 wherein the pinned layer structure is an antiparallel (AP) pinned layer structure which is formed comprising the steps of:

forming ferromagnetic first and second antiparallel (AP) pinned layers, forming an antiparallel (AP) coupling layer between the first and second AP pinned layers;

forming the first AP pinned layer between the pinning layer and the AP coupling layer; and forming the first AP pinned layer with said first and second cobalt based films and the nickel iron (NiFe) film.

20. A method of making a magnetic read head as claimed in claim 19 wherein the pinning layer is formed of platinum manganese (PtMn).

21. A method of making a magnetic read head as claimed in claim 20 wherein the free layer structure is formed including a nickel iron (NiFe) layer and a cobalt iron (CoFe) layer with the cobalt iron (CoFe) layer interfacing the spacer layer.

22. A method of making a magnetic head assembly comprising the steps of:

making a write head comprising the steps of:

forming ferromagnetic first and second pole piece layers in pole tip, yoke and back gap regions wherein the yoke region is located between the pole tip and back gap regions;

forming a nonmagnetic nonconductive write gap layer between the first and second pole piece layers in the pole tip region;

forming an insulation stack with at least one coil layer embedded therein between the first and second pole piece layers in the yoke region; and connecting the first and second pole piece layers at said back gap region; making a read head as follows:

forming a spin valve sensor;

connecting first and second hard bias and lead layers to the spin valve sensor;

forming nonmagnetic nonconductive first and second read gap layers;

forming the spin valve sensor and the first and second hard bias and lead layers between the first and second read gap layers;

forming a ferromagnetic first shield layer; and forming the first and second read gap layers between the first shield layer and the first pole piece layer; and a making of the spin valve sensor including:

forming a ferromagnetic free layer structure that has a magnetic moment;

forming a ferromagnetic pinned layer structure that has a magnetic moment;

forming a nonmagnetic conductive spacer layer between the free layer structure and the pinned layer structure;

forming an antiferromagnetic metallic pinning layer exchange coupled to the first pinned layer structure for pinning the magnetic moment of the pinned layer structure;

forming the pinned layer structure with first and second cobalt based films and a nickel iron (NiFe)

film with the nickel iron (NiFe) film being located between and interfacing the first and second cobalt (Co) based films; and forming the first cobalt (Co) based film interfacing the metallic pinning layer.

23. A method of making a magnetic head assembly as claimed in claim 22 wherein the pinning layer is formed between the first read gap layer and the pinned layer structure.

24. A method of making a magnetic head assembly as claimed in claim 23 wherein the pinned layer structure is an antiparallel (AP) pinned layer structure which is formed comprising the steps of:

forming ferromagnetic first and second antiparallel (AP) pinned layers;

forming an antiparallel (AP) coupling layer between the first and second AP pinned layers;

forming the first AP pinned layer between the pinning layer and the AP coupling layer; and forming the first AP pinned layer with said first and second cobalt based films and the nickel iron (NiFe) film.

25. A method of making a magnetic head assembly as claimed in claim 24 wherein the pinning layer is formed of platinum manganese (PtMn).

26. A method of making a magnetic head assembly as claimed in claim 25 wherein the free layer structure is formed including a nickel iron (NiFe) layer and a cobalt iron (CoFe) layer with the cobalt iron (CoFe) layer interfacing the spacer layer.

27. A magnetic read head comprising:

a spin valve sensor that includes:

a ferromagnetic free layer structure that has a magnetic moment;

nonmagnetic electrically conductive first and second spacer layers;

the free layer structure being located between the first and second spacer layers;

first and second antiparallel (AP) pinned layer structures;

the first and second spacer layers being located between the first and second AP pinned layer structures;

the first AP pinned layer structure including a first antiparallel AP coupling layer and ferromagnetic first and second antiparallel (AP) pinned layers with the first AP coupling layer being located between and interfacing the first and second AP pinned layers;

the second AP pinned layer structure including a second antiparallel AP coupling layer and ferromagnetic third and fourth antiparallel (AP) pinned layers with the second AP coupling layer being located between and interfacing the third and fourth AP pinned layers;

the second and fourth AP pinned layers consisting of a cobalt (Co) based material and interfacing the first and second spacer layers respectively;

the first AP pinned layer including ferromagnetic first, second and third films with the second film being located between and interfacing the first and third films and the third AP pinned layer including ferromagnetic fourth, fifth and sixth films with the fifth film being located between and interfacing the fourth and sixth films;

the second and fifth films being nickel iron (NiFe) based and the first, third, fourth and sixth films being cobalt based;

antiferromagnetic first and second metallic pinning layers; and the first pinning layer interfacing the first film for pinning a magnetic moment of the first AP pinned layer and the second pinning layer interfacing the fourth film for pinning a magnetic moment of the third AP pinned layer.

28. A magnetic read head as claimed in claim 27 including:

first and second hard bias and lead layers connected to the spin valve sensor;

nonmagnetic nonconductive first and second read gap layers;

the spin valve sensor and the first and second hard bias and lead layers being located between the first and second read gap layers;

ferromagnetic first and second shield layers, and the first and second read gap layers being located between the first and second shield layers.

29. A magnetic read head as claimed in claim 28 wherein each of the first and second pinning layers is platinum manganese (PtMn).

30. A magnetic read head as claimed in claim 29 wherein the first pinning layer is located between the first read gap layer and the first film and the second pinning layer is located between the second read gap layer and the fourth film.

31. A magnetic read head as claimed in claim 30 including:

the free layer structure including a nickel iron (NiFe) layer and first and second cobalt iron (CoFe) layers wherein the nickel iron (NiFe) layer is located between the first and second cobalt iron (CoFe) layers; and the first cobalt iron (CoFe) layer of the free layer structure interfacing the first spacer layer and the second cobalt iron (CoFe) layer of the free layer structure interfacing the second spacer layer.

32. A magnetic head assembly comprising:

a write head including:

ferromagnetic first and second pole piece layers wherein each of the first and second pole piece layers has a pole tip portion, a yoke portion and a back gap portion with the yoke portion located between the pole tip portion and the back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions; a read head including:

a spin valve sensor;

first and second hard bias and lead layers connected to the valve sensor;

nonmagnetic nonconductive first and second read gap layers;

the spin valve sensor and the first and second hard bias and lead layers being located between the first and second read gap layers;

a ferromagnetic first shield layer; and the first and second read gap layers being located between the first shield layer and the first pole piece layer;

the spin valve sensor including:

a ferromagnetic free layer structure that has a magnetic moment;

nonmagnetic electrically conductive first and second spacer layers;

the free layer structure being located between the first and second spacer layers;

first and second antiparallel (AP) pinned layer structures;

the first and second spacer layers being located between the first and second AP pinned layer structures;

the first AP pinned layer structure including a first antiparallel AP coupling layer and ferromagnetic first and second antiparallel (AP) pinned layers with the first AP coupling layer being located between and interfacing the first and second AP pinned layers;

the second AP pinned layer structure including a second antiparallel AP coupling layer and ferromagnetic third and fourth antiparallel (AP) pinned layers with the second AP coupling layer being located between and interfacing the third and fourth AP pinned layers;

the second and fourth AP pinned layers consisting of a cobalt (Co) based material and interfacing the first and second spacer layers respectively;

the first AP pinned layer including ferromagnetic first, second and third films with the second film being located between and interfacing the first and third films and the third AP pinned layer including ferromagnetic fourth, fifth and sixth films with the fifth film being located between and interfacing the fourth and sixth films;

the second and fifth films being nickel iron (NiFe) based and the first, third, fourth and sixth films being cobalt based;

antiferromagnetic first and second metallic pinning layers; and the first pinning layer interfacing the first film for pinning a magnetic moment of the first AP pinned layer and the second pinning layer interfacing the fourth film for pinning a magnetic moment of the third AP pinned layer.

33. A magnetic head assembly as claimed in claim 32 wherein each of the first and second pinning layers is platinum manganese (PtMn).

34. A magnetic head assembly as claimed in claim 33 wherein the first pinning layer is located between the first read gap layer and the first film and the second pinning layer is located between the second read gap layer and the fourth film.

35. A magnetic head assembly as claimed in claim 34 including:

the free layer structure including a nickel iron (NiFe) layer and first and second cobalt iron (CoFe) layers wherein the nickel iron (NiFe) layer is located between the first and second cobalt iron (CoFe) layers; and the first cobalt iron (CoFe) layer of the free layer structure interfacing the first spacer layer and the second cobalt iron (CoFe) layer of the free layer structure interfacing the second spacer layer.

36. A magnetic disk drive having a magnetic head assembly wherein the magnetic head assembly has a write head and a read head, comprising:

the write head including:
ferromagnetic first and second pole piece layers wherein each of the first and second pole piece layers has a pole tip portion, a yoke portion and a back gap portion with the yoke portion located between the pole tip portion and the back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions;

the read head including:
a spin valve sensor;
first and second hard bias and lead layers connected to the spin valve sensor;
nonmagnetic nonconductive first and second read gap layers;
the spin valve sensor being located between the first and second read gap layers;
a ferromagnetic first shield layer; and
the first and second read gap layers being located between the first shield layer and the first pole piece layer;

the spin valve sensor including:
a ferromagnetic free layer structure that has a magnetic moment;
nonmagnetic electrically conductive first and second spacer layers;
the free layer structure being located between the first and second spacer layers;
first and second antiparallel (AP) pinned layer structures;
the first and second spacer layers being located between the first and second AP pinned layer structures;
the first AP pinned layer structure including a first antiparallel AP coupling layer and ferromagnetic first and second antiparallel (AP) pinned layers with the first AP coupling layer being located between and interfacing the first and second AP pinned layers;
the second AP pinned layer structure including a second antiparallel AP coupling layer and ferromagnetic third and fourth antiparallel (AP) pinned layers with the second AP coupling layer being located between and interfacing the third and fourth AP pinned layers;
the second and fourth AP pinned layers consisting of a cobalt (Co) based material and interfacing the first and second spacer layers respectively;
the first AP pinned layer including ferromagnetic first, second and third films with the second film being located between and interfacing the first and third films and the third AP pinned layer including ferromagnetic fourth, fifth and sixth films with the fifth film being located between and interfacing the fourth and sixth films;
the second and fifth films being nickel iron (NiFe) based and the first, third, fourth and sixth films being cobalt based;
antiferromagnetic first and second metallic pinning layers; and
the first pinning layer interfacing the first film for pinning a magnetic moment of the first AP pinned layer and the second pinning layer interfacing the fourth film for pinning a magnetic moment of the third AP pinned layer;
a housing;
a magnetic disk rotatably supported in the housing;

a support mounted in the housing for supporting the magnetic head assembly with a head surface of the magnetic head assembly facing the magnetic disk so that the magnetic head assembly is in a transducing relationship with the magnetic disk;

a spindle motor for rotating the magnetic disk;

an actuator positioning means connected to the support for moving the magnetic head assembly to multiple positions with respect to said magnetic disk; and a processor connected to the magnetic head assembly, to the spindle motor and to the actuator positioning means for exchanging signals with the magnetic head assembly, for controlling movement of the magnetic disk and for controlling the position of the magnetic head assembly.

37. A magnetic disk drive as claimed in claim 36 wherein each of the first and second pinning layers is platinum manganese (PtMn).

38. A magnetic disk drive as claimed in claim 37 wherein the first pinning layer is located between the first read gap layer and the first film and the second pinning layer is located between the second read gap layer and the fourth film.

39. A magnetic disk drive as claimed in claim 38 including:

the free layer structure including a nickel iron (NiFe) layer and first and second cobalt iron (CoFe) layers wherein the nickel iron (NiFe) layer is located between the first and second cobalt iron (CoFe) layers; and the first cobalt iron (CoFe) layer of the free layer structure interfacing the first spacer layer and the second cobalt iron (CoFe) layer of the free layer structure interfacing the second spacer layer.

40. A method of making a magnetic read head comprising the steps of:

making a spin valve sensor that includes the steps of:

forming a ferromagnetic free layer structure that has a magnetic moment;

forming nonmagnetic electrically conductive first and second spacer layers;

forming the free layer structure between the first and second spacer layers;

forming first and second antiparallel (AP) pinned layer structures;

forming the first and second spacer layers between the first and second AP pinned layer structures;

forming the first AP pinned layer structure with a first antiparallel AP coupling layer and ferromagnetic first and second antiparallel (AP) pinned layers with the first AP coupling layer located between and interfacing the first and second AP pinned layers;

forming the second AP pinned layer structure with a second antiparallel AP coupling layer and ferromagnetic third and fourth antiparallel (AP) pinned layers with the second AP coupling layer located between and interfacing the third and fourth AP pinned layers;

forming the second and fourth AP pinned layers of only a cobalt (Co) based material and interfacing the second and fourth AP pinned layers with the first and second spacer layers respectively;

forming the first AP pinned layer with ferromagnetic first, second and third films with the second film located between and interfacing the first and third films and the third AP pinned layer with ferromagnetic fourth, fifth and sixth films with the fifth film located between and interfacing the fourth and sixth films;

forming the second and fifth films nickel iron (NiFe) based and the first, third, fourth and sixth films cobalt based;

forming antiferromagnetic first and second metallic pinning layers; and forming the first pinning layer interfacing the first film for pinning a magnetic moment of the first AP pinned layer and the second pinning layer interfacing the fourth film for pinning a magnetic moment of the third AP pinned layer.

41. A method of making a magnetic read head as claimed in claim 40 further comprising the steps of:

connecting first and second hard bias and lead layers to the spin valve sensor;

forming nonmagnetic nonconductive first and second read gap layers;

forming the spin valve sensor and the first and second hard bias and lead layers between the first and second read gap layers;

forming ferromagnetic first and second shield layers; and forming the first and second read gap layers between the first and second shield layers.

42. A method of making a magnetic read head as claimed in claim 41 wherein each of the first and second pinning layers is formed of platinum manganese (PtMn).

43. A method of making a magnetic read head as claimed in claim 42 wherein the first pinning layer is formed between the first read gap layer and the first film and the second pinning layer is formed between the second read gap layer and the fourth film.

44. A method of making a magnetic read head as claimed in claim 43 further comprising the steps of:

forming the free layer structure including a nickel iron (NiFe) layer and first and second cobalt iron (CoFe) layers wherein the nickel iron (NiFe) layer is located between the first and second cobalt iron (CoFe) layers; and forming the first cobalt iron (CoFe) layer of the free layer structure interfacing the first spacer layer and the second cobalt iron (CoFe) layer of the free layer structure interfacing the second spacer layer.

45. A method of making a magnetic head assembly comprising the steps of:

making a write head comprising the steps of:

forming ferromagnetic first and second pole piece layers in pole tip, yoke and back gap regions wherein the yoke region is located between the pole tip and back gap regions;

forming a nonmagnetic nonconductive write gap layer between the first and second pole piece layers in the pole tip region;

forming an insulation stack with at least one coil layer embedded therein between the first and second pole piece layers in the yoke region; and connecting the first and second pole piece layers at said back gap region;

making a read head comprising the steps of:

forming a spin valve sensor;

connecting first and second hard bias and lead layers to the spin valve sensor;

forming nonmagnetic nonconductive first and second read gap layers;

forming the spin valve sensor and the first and second hard bias and lead layers between the first and second read gap layers;

forming a ferromagnetic first shield layer; and forming the first and second read gap layers between the first shield layer and the first pole piece layer; and a making of the spin valve sensor comprising the steps of:

forming a ferromagnetic free layer structure that has a magnetic moment;

forming nonmagnetic electrically conductive first and second spacer layers;

forming the free layer structure between the first and second spacer layers;

forming first and second antiparallel (AP) pined layer structures;

forming the first and second spacer layers between the first and second AP pinned layer structures;

forming the first AP pinned layer structure with a first antiparallel AP coupling layer and ferromagnetic first and second antiparallel (AP) pinned layers with the first AP coupling layer located between and interfacing the first and second AP pinned layers;

forming the second AP pinned layer structure with a second antiparallel AP coupling layer and ferromagnetic third and fourth antiparallel (AP) pinned layers with the second AP coupling layer located between and interfacing the third and fourth AP pinned layers;

forming the second and fourth AP pinned layers of only a cobalt (Co) based material and interfacing the second and fourth AP pinned layers with the first and second spacer layers respectively;

forming the first AP pinned layer with ferromagnetic first, second and third films with the second film located between and interfacing the first and third films and the third AP pinned layer with ferromagnetic fourth, fifth and sixth films with the fifth film located between and interfacing the fourth and sixth films;

forming the second and fifth films nickel iron (NiFe) based and the first, third, fourth and sixth films cobalt based;

forming antiferromagnetic first and second metallic pinning layers; and forming the first pinning layer interfacing the first film for pinning a magnetic moment of the first AP pinned layer and the second pinning layer interfacing the fourth film for pinning a magnetic moment of the third AP pinned layer.

46. A method of making a magnetic head assembly as claimed in claim 45 wherein each of the first and second pinning layers is formed of platinum manganese (PtMn).

47. A method of making a magnetic head assembly as claimed in claim 46 wherein the first pinning layer is formed between the first read gap layer and the first film and the second pinning layer is formed between the second read gap layer and the fourth film.

48. A method of making a magnetic head assembly as claimed in claim 47 further comprising the steps of:

forming the free layer structure including a nickel iron (NiFe) layer and first and second cobalt iron (CoFe) layers wherein the nickel iron (NiFe) layer is located between the first and second cobalt iron (CoFe) layers; and forming the first cobalt iron (CoFe) layer of the free layer structure interfacing the first spacer layer and the second cobalt iron (CoFe) layer of the free layer structure interfacing the second spacer layer.

* * * * *